US009395460B2

(12) United States Patent
Eick et al.

(10) Patent No.: US 9,395,460 B2
(45) Date of Patent: Jul. 19, 2016

(54) CONTINUOUS COMPOSITE RELATIVELY ADJUSTED PULSE

(75) Inventors: Peter M. Eick, Houston, TX (US); Joel D. Brewer, Houston, TX (US); Frank D. Janiszewski, Richmond, TX (US); Charles C. Mosher, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 1043 days.

(21) Appl. No.: 13/185,140

(22) Filed: Jul. 18, 2011

(65) Prior Publication Data

US 2012/0014212 A1    Jan. 19, 2012

Related U.S. Application Data

(60) Provisional application No. 61/365,631, filed on Jul. 19, 2010, provisional application No. 61/365,663, filed on Jul. 19, 2010, provisional application No. 61/494,952, filed on Jun. 9, 2011.

(51) Int. Cl.
   *G01V 1/38*    (2006.01)

(52) U.S. Cl.
   CPC .................................. *G01V 1/3808* (2013.01)

(58) Field of Classification Search
   CPC ................................................. G01V 1/3808
   USPC .......................................................... 367/23
   See application file for complete search history.

(56) References Cited

U.S. PATENT DOCUMENTS

| | | | |
|---|---|---|---|
| 3,332,512 A | 7/1967 | Sundt | |
| 3,523,277 A | 8/1970 | Landrum, Jr. | |
| 3,687,218 A * | 8/1972 | Ritter | 367/23 |
| 3,895,343 A | 7/1975 | Farr | |
| 4,144,949 A * | 3/1979 | Silverman | 181/106 |
| 4,223,399 A * | 9/1980 | Hackett | 367/41 |
| 4,751,687 A | 6/1988 | Christensen | |
| 4,800,538 A * | 1/1989 | Passmore et al. | 367/55 |
| 5,142,498 A | 8/1992 | Duren | |
| 5,448,531 A | 9/1995 | Dragoset, Jr. | |
| 5,995,452 A | 11/1999 | Bouyoucus | |
| 6,028,818 A | 2/2000 | Jeffryes | |
| 6,882,938 B2 | 4/2005 | Vaage et al. | |
| 6,906,981 B2 * | 6/2005 | Vaage | 367/21 |
| 7,492,665 B2 * | 2/2009 | Robertsson et al. | 367/40 |
| 7,515,505 B2 | 4/2009 | Krohn et al. | |

(Continued)

OTHER PUBLICATIONS

PCT International Search Report PCT/US2011/044494 (PCT Form PCT/ISA/220) dated Nov. 25, 2011.

*Primary Examiner* — Daniel L Murphy
(74) *Attorney, Agent, or Firm* — ConocoPhillips Company

(57) ABSTRACT

The invention relates to continuously or near continuously acquiring seismic data where at least one pulse-type source is fired in a distinctive sequence to create a series of pulses and to create a continuous or near continuous rumble. In a preferred embodiment, a number of pulse-type seismic sources are arranged in an array and are fired in a distinctive loop of composite pulses where the returning wavefield is source separable based on the distinctive composite pulses. Firing the pulse-type sources creates an identifiable loop of identifiable composite pulses so that two or more marine seismic acquisition systems with pulse-type seismic sources can acquire seismic data concurrently, continuously or near continuously and the peak energy delivered into the water will be less, which will reduce the irritation of seismic data acquisition to marine life.

28 Claims, 8 Drawing Sheets

(56) References Cited

U.S. PATENT DOCUMENTS

| | | | |
|---|---|---|---|
| 7,634,941 B2 * | 12/2009 | Henne et al. | 73/147 |
| 8,818,730 B2 * | 8/2014 | Eick et al. | 702/16 |
| 2006/0083109 A1 * | 4/2006 | Kimura et al. | 367/38 |
| 2007/0274155 A1 | 11/2007 | Ikelle | |
| 2008/0192864 A1 | 8/2008 | Szajnowski | |
| 2009/0010103 A1 | 1/2009 | Sallas et al. | |
| 2010/0039894 A1 | 2/2010 | Abma | |

* cited by examiner

500
CONTINUOUS COMPOSITE RELATIVELY ADJUSTED PULSE

CROSS-REFERENCE TO RELATED APPLICATIONS

This application is a non-provisional application which claims benefit under 35 USC §119(e) to U.S. Provisional Application Ser. No. 61/365,631, filed Jul. 19, 2010 entitled "Unique Composite Relatively Adjusted Pulse" and U.S. Provisional Patent Application Ser. No. 61/365,663, filed Jul. 19, 2010 entitled "Continuous Composite Relatively Adjusted Pulse" and U.S. Provisional Patent Application Ser. No. 61/494,952, filed Jun. 9, 2011 entitled "High Density Source Spacing Using Continuous Composite Relatively Adjusted Pulse", which are all incorporated herein in their entirety.

STATEMENT REGARDING FEDERALLY SPONSORED RESEARCH OR DEVELOPMENT

None.

FIELD OF THE INVENTION

This invention relates to emitting seismic energy into a marine environment that is able to travel into the seafloor and reflect from and refract through geological structures and be received and recorded by hydrophones.

BACKGROUND OF THE INVENTION

It is very expensive to acquire seismic data in marine environments. The cost of mobilizing vessels, equipment and people can run in the several hundreds of thousands to millions of dollars per day. Thus, once the survey is started, there is a lot of pressure to acquire data twenty-four hours a day, seven days a week. A problem arises when another survey crew is collecting data in the same general area at the same time. The two operations may contaminate one another and be forced to work out a time sharing arrangement where only one crew acquires data for a period of time and then waits while the other crew takes a turn. It is common to time share seismic data collection in the North Sea off of northwest Europe and in the Gulf of Mexico among other areas.

A second concern in the collection of seismic data in marine environments is harm, injury or irritation of whales and other marine life due to the intensity of the energy coming off the seismic sources. Air guns are traditionally used in an array to generate a single pulse powerful enough to get echo returns from deep below the seafloor. The power of these pulses in the water is presumed to be at least annoying to sea animals that use echo location like whales, dolphins and others. Seismic surveying techniques may cause these animals to leave the area and some believe that it may be harmful to sea life.

A solution is needed for each of these issues. A solution for both would be particularly well received.

BRIEF SUMMARY OF THE DISCLOSURE

The invention more particularly relates to a process for acquiring seismic data and provides information about geologic structures in the earth, wherein a plurality of seismic receivers are provided to receive seismic energy. At least one pulse type seismic source is provided to emit pulses of seismic energy into the earth and a distinctive series of pulses of seismic energy are fired into the earth to create a seismic energy wavefield response from geologic structures in the earth. The distinctive series of pulses of seismic energy are delivered in a continual loop or near continual loop from the pulse-type seismic source in a planned order where the loop is of sufficient length to provide listening time to receive the wave field response from the geologic structures in the earth from a portion of the loop defined as a composite pulse before the distinctive series of pulses of the loop end and are restarted and wherein the series of pulses within the loop are sufficiently distinctive so as not to confuse parts of the loop with other parts of the loop and sufficiently distinctive so as to distinguish the wavefield caused by the loop from seismic energy in the environment that arises from other sources. The seismic receivers receive seismic energy including the seismic energy wavefield response from the geologic structures in the earth. The seismic energy wavefield response received by the seismic receivers is recorded to form data traces and the data traces of recorded seismic energy are processed to separately identify within the data traces the composite pulses of the pulse-type seismic source individual pulses and the location of the pulse type seismic source when the composite pulses were fired.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
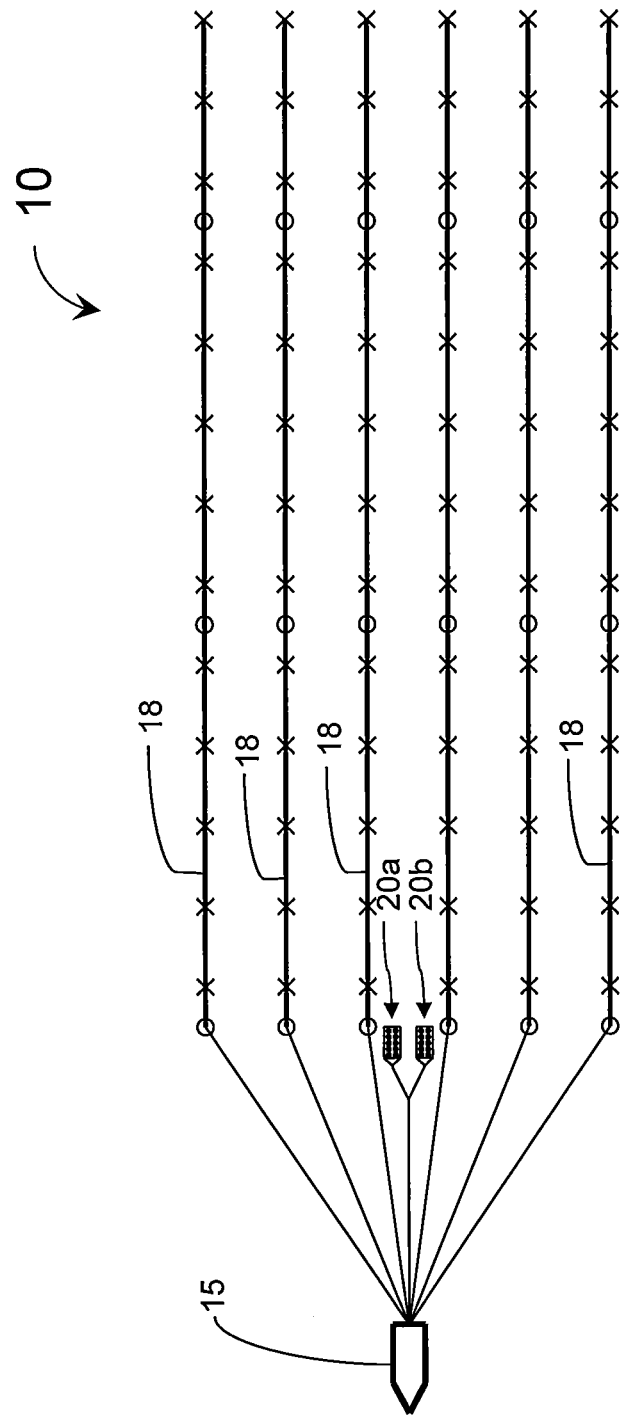
FIG. 1 is a schematic top view of a tow vessel towing two seismic source arrays and streamers for acquiring seismic data in a marine environment.

For the purpose of this discussion an air gun seismic source will be used as an example of an impulsive seismic source. It should be understood that there are other impulsive sources that could be used with this invention for example plasma shots, steam injection sources or even explosive based sources. As shown in FIG. 1, a seismic acquisition system is generally indicated by the arrow 10. The system 10 includes a tow vessel 15 towing a number of streamers 18. Along each streamer 18 are a large number of seismic receivers, not specifically indicated. The seismic sources are also towed behind tow vessel 15 in the form of two source gun arrays, 20a and 20b. It is common to use air guns in marine seismic acquisition and for each source gun array to comprise a number of air guns where all the air guns are fired in unison or at once to create a sufficiently powerful impulse to create a return wavefield that is perceptible by the seismic receivers along the streamers 18. It is also common to tow two sets of source gun arrays forming the port and starboard gun array set.

The current state of the art in seismic acquisitions requires that all of the guns in the arrays fire at once. The common timing spec is that all guns must fire within 1 ms of each other. If all the guns don't fire within the 1 ms window, then the array must be recovered and repaired until it meets the required specification. Normally a source gun array will be formed of 2 to 3 sub-arrays, and each sub-array will be made up of around 10 individual air guns of varying sizes. In normal operation, all 30 (in our example) of these guns will be fired almost simultaneously to try and create a single, sharp peak of energy. The varied sizes of the guns provide a large composite peak of energy with little or no reverberation by firing simultaneously and creating air bubbles that cancel each other out so that the large composite peak will propagate through the sea and into the seafloor. By conventional standards this is the optimal way of sourcing marine seismic data.

According to the present invention, the guns should not be fired in unison, but are fired in a series of pulses that are arranged into one or more composite pulses that are unique or at least distinctive and can be distinguished in the return wavefield from other seismic energy in the environment and also distinguished from other composite pulses. The composite pulses result in rumbles instead of the traditional crack of the guns firing in unison so that there is no large composite peak at the start of the source event. The present invention further includes the delivery of pulses in the form of a loop of distinctive composite pulses where not only is the loop distinctive, but the composite pulses within the loop are distinctive one from another. The loop is of sufficient length in time to permit recording of the returning wavefield before the end of the loop is reached and restarted. In practice, the loop will be delivered continuously or nearly continuously to obtain significant volumes of seismic data at conventional boat speeds. Since the pulses are delivered in distinctive sequences, several spaced apart sources may be deployed to create and gather seismic data from a variety of angles concurrently. As such, the pulse-type sources, typically air guns, may be arranged in a number of arrays with each array delivering its own loop of pulses of seismic energy in a synchronized or non-synchronized manner that is source separable in the data traces of the recorded return wavefield.

Figure 2:
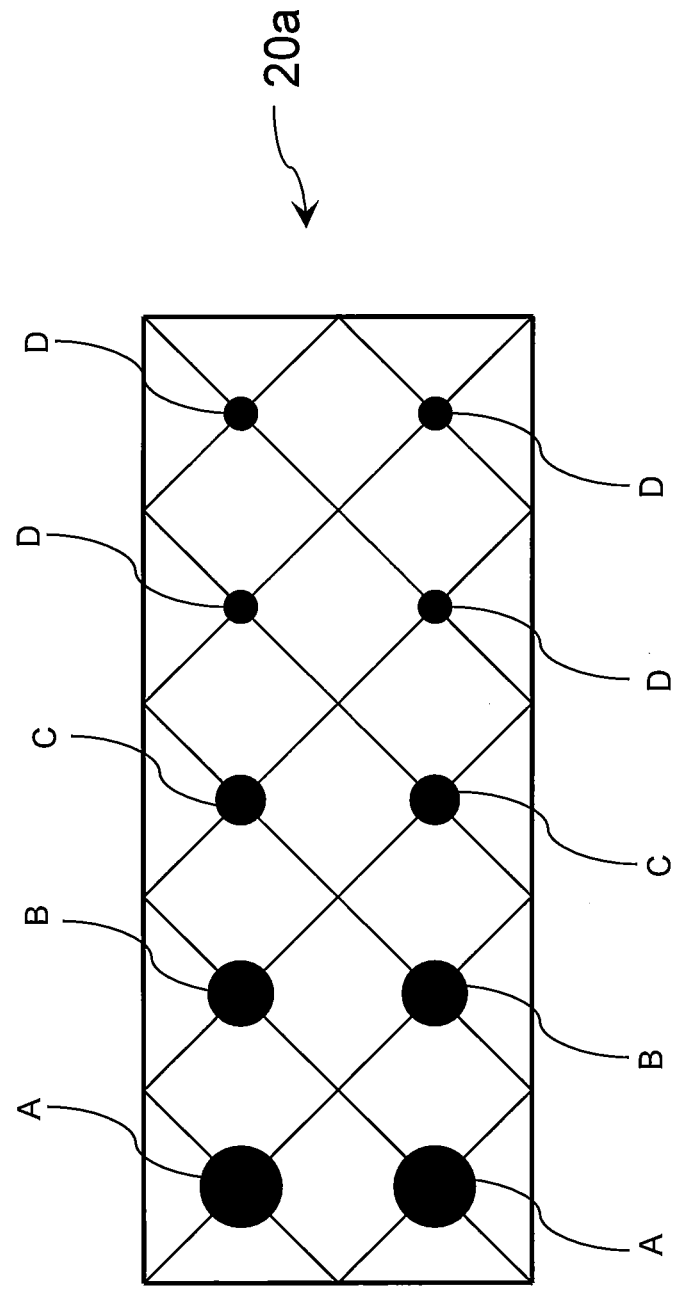
FIG. 2 is a schematic top view of an example source array of air guns.

In one preferred arrangement shown in FIG. 1, the source arrays are generally indicated by the arrow 20a and 20b comprising two side-by-side arrays. As shown in FIG. 2, source gun array 20a is shown with ten individual air guns where the extra large guns are labeled A, the large guns are labeled B, the medium guns are labeled C and the small guns are labeled D. The two extra large air guns A provide very low frequency seismic energy, the two large air guns B generate low frequency energy, the two medium air guns C provide more mid-frequency seismic energy and the four small air guns D provide higher frequency seismic energy. Normally, an array comprises many more air guns and more air guns of different sizes. It is also typical to have more small air guns than large air guns to make up for the lower amount of energy that is released by one pulse of each smaller air gun. This is all part of the traditional tuning of the source to give the sharpest, cleanest peak with the minimal bubble effects. It is also normal to put the biggest guns first for ease of deployment and stable towing conditions through the water. These are not requirements and are more a matter of convenience.

Figure 3:
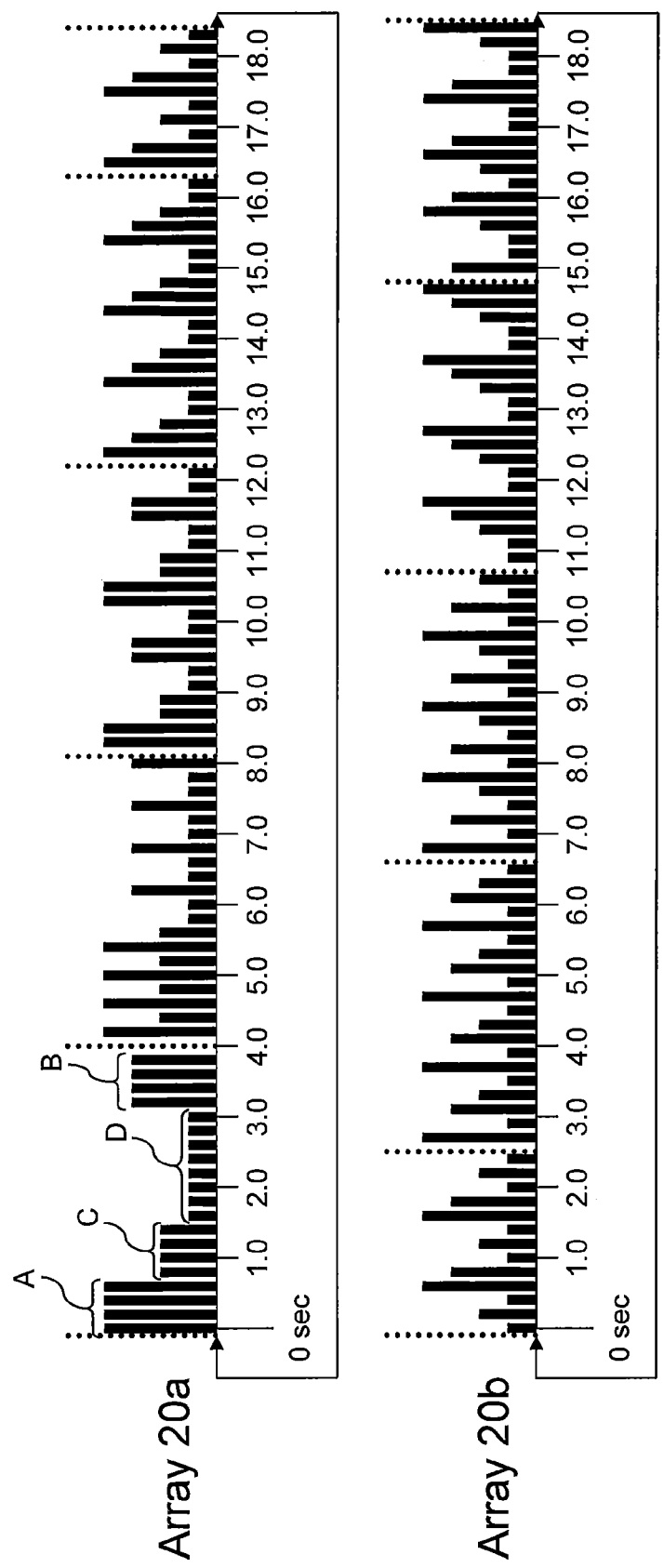
FIG. 3 is a chart showing two example loops of series of pulses.

Continuing the explanation of the present invention as related to system 10 illustrated in FIG. 1, referring now to FIG. 3, a composite pulse firing sequence for the arrays 20a and 20b is different than conventional operations where one array of air guns is fired in unison and the second array of air guns is later fired in unison while the first array is recharged for a future volley. In the present invention, the two arrays are operated together with each creating a series of distinctive composite pulses continuously or near continuously where no composite pulse is repeated more often than the desired recorded record length. Simply put, each source array emits a continuous or near continuous series of pulses that can be subdivided into distinctive composite pulses that are repeated as a loop of length greater than or equal to the desired recorded record length and no other source in the area delivers pulses that are in-distinct from the composite pulses. The composite pulses are designed to be distinctive as compared to the composite pulses of any other sources in the vicinity. These other sources could be towed by the same or other vessels in the vicinity which offers great flexibility in acquisition designs and field operations. An example composite pulse firing sequence loop is shown in FIG. 3 for two gun arrays, array 20a and 20b, where the large bars A indicate the firing of an extra large air gun A, the smaller bars B indicate the firing of a large air gun B, and so forth. With the density of the bars in the Figure, not all of the bars are labeled. However, since there are only four sizes of bars, it should be clear that the tallest bars are the A's and shortest are the D's, etc. The two parallel loops of distinctive composite pulses shown in FIG. 3 are emitted by source gun array 20a and 20b as labeled. Each distinctive composite sequence is comprised of the bars between the dashed lines so that a loop is comprised of distinctive composite pulses or the loop may be divided into distinctive composite pulses. In actuality, if the loop is properly defined to not have repeating pulse segments, it may be divided into several alternative and different arrangements of multiple composite pulses where in one alternative, the loop has say ten composite pulses and in another alternative, the loop has nine composite pulses. The distinctions between the composite pulses within a loop may be more or less arbitrary but must yield distinctive composite pulses.

Typically, a listen time is provided after each firing of each composite pulse. However, considering that this example loop is divisible into multiple composite pulses, the listen time for the return for each composite pulse actually begins at the firing of the first gun that forms part of the composite pulse. Thus, as long as the entire loop of composite pulses is distinctive and does not have repeating patterns within the loop and the loop is long enough to provide sufficient listening time from the firing of the last gun contributing to a distinctive subdivided sequence, the guns may be fired in the loop, continuously and over and over. Typical listening times are between 6 and 15 seconds. With a loop that is as long or longer than the listening time plus the duration of the composite pulse, the only limitation is the recharging ability of the compressor and the ability to deliver the compressed air to the air guns fast enough. The elapsed time between each air gun firing in the inventive system is typically between about ten milliseconds up to several hundreds of milliseconds, but typically in the twenty to five hundred ms range. From a practical standpoint, as long as the loop is unique, computer analysis of the return wavefield will be able to identify the composite pulses from the loop of composite pulses contained in the returned wavefield as distinct from pulses from any other source of pulses. With a continuously emitting seismic source and a continuously moving tow vessel and source and receiver arrays, the density of data in the data record will be substantial when coupled with a continuous recording system or near continuous recording system.

As shown in FIG. 3, the air guns in the array 20a and 20b generate a loop of five distinct composite pulses over slightly more than 18 seconds. Due to the limitations of the drawing, the sources are being fired at 200 ms intervals with no variation in time spacing except that between composite pulses where an extra 200 ms gap is shown to help separate the composite pulses within the loop and a dashed line is placed. It would generally be preferred that the delays are between about 20 ms and 500 ms and structured for increased uniqueness or distinctness of the composite pulses and the loops. Moreover, the guns do not need to fire alone. Certainly multiple guns may fire concurrently, but it is preferred that the guns have individual signatures (be different in size or character) for signal separation. The first composite pulse of the loop for array 20a starts with the firings of the extra large guns A with 200 ms gaps, followed by the medium guns C, followed by the small guns D and then the large guns B. The second composite pulse in array 20a of the loop begins at about the four second mark. It should be appreciated that a longer gap in the loop may be used or the next composite pulse may begin right at the end of the previous composite pulse as long as the composite pulses are distinct from one another within the loop. Also it should be noted that there may be other composite pulses that can be created within a designed loop if it is considered that the qualification for a composite pulse is that it be distinct from any other composite pulse within the loop or any other pulses from a nearby source that might fire within an associated listening time.

Associated with the firing of each composite pulse within the loop, there is a listening time that starts with the initial firing time of the first gun in the composite pulse and recognizing that the listening includes reference to the arrangement of guns fired following the composite pulse to identify within the data traces which gun at which location was fired to produce the specific data trace. When utilizing a continuous or near continuous seismic recording system, the zero time used for setting the extraction of individual seismic records is set by the initial firing time of the first gun contributing to the particular composite pulse being extracted. The extracted record length would then be the desired listening time that is less than or equal to the length of the full loop minus the length of the particular composite pulse. This extracted record would be one input to the process of separating the wavefield associated with this particular composite pulse. The implication of the continuous or near continuous seismic recording and the subsequent extraction of seismic records associated with each composite pulse within the source firing loop coupled with the fact the tow vessel generally acquires data a speed of between 4 to 5 knots results in the creation of a dense inline spatially sampled source data set. The advantages gained from this dense source sampled data set are numerous when processing the data set, including improvements in noise attenuation, multiple attenuation, velocity analysis, frequency content and overall subsurface resolution.

Continuing with the explanation of FIG. 3, the second composite pulse immediately follows the first, but is distinctly different than the first composite pulse and one that is readily identifiable in post gathering processing. The second composite pulse or volley comprises extra large and medium guns firing in alternation at 100 ms intervals until all of those sized guns within the array 20a is fired, followed by an alternating series from two smaller guns and one large gun at 100 ms intervals. This second composite pulse is completed at about eight seconds. The third composite pulse in array 20a includes pairs of equal sized guns firing in sequence beginning with extra large A to medium C to small D to large B and finally to small D again: A, C, D, B, D. This concludes at about the twelve second mark. The fourth composite pulse begins with an extra large gun A and then follows with a descending size succession through a large B, medium C and two small guns D: A, B, C, D, D. This descending succession is repeated four times until all of the guns in the array 20a have fired which occurs just beyond the sixteen second mark. The next and final composite pulse in the 18.5 second loop is similar to the fourth composite pulse except that the firing of the two small guns D is separated by the medium gun rather than both following the medium gun: A, B, D, C, D. The array 20b is fired near simultaneously with array 20b but with a distinctly different firing pattern that yields five distinct composite pulses that form a distinct 18.5 second loop from the array 20a. In practice the source arrays 20a and 20b would be spatially separated to produce wavefields that illuminate different subsurface areas or the same subsurface area but from different orientations.

Figure 4:
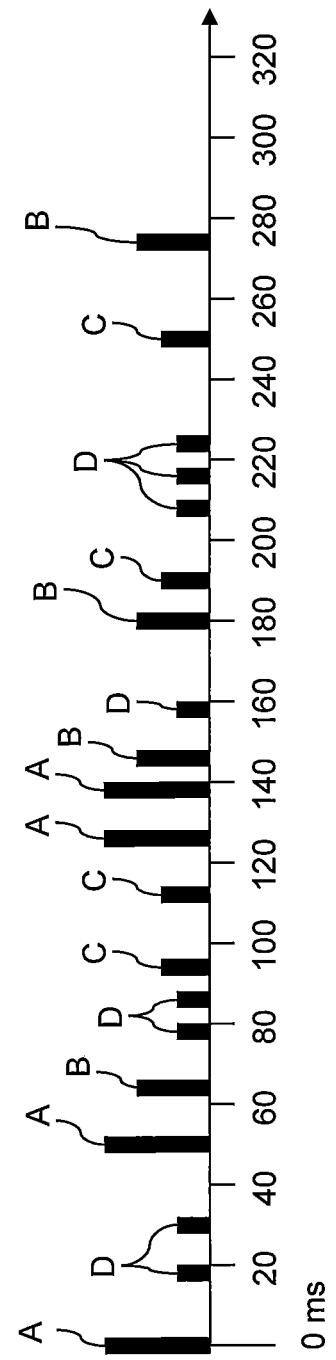
FIG. 4 is a chart showing a second example series of pulses.
Figure 8:
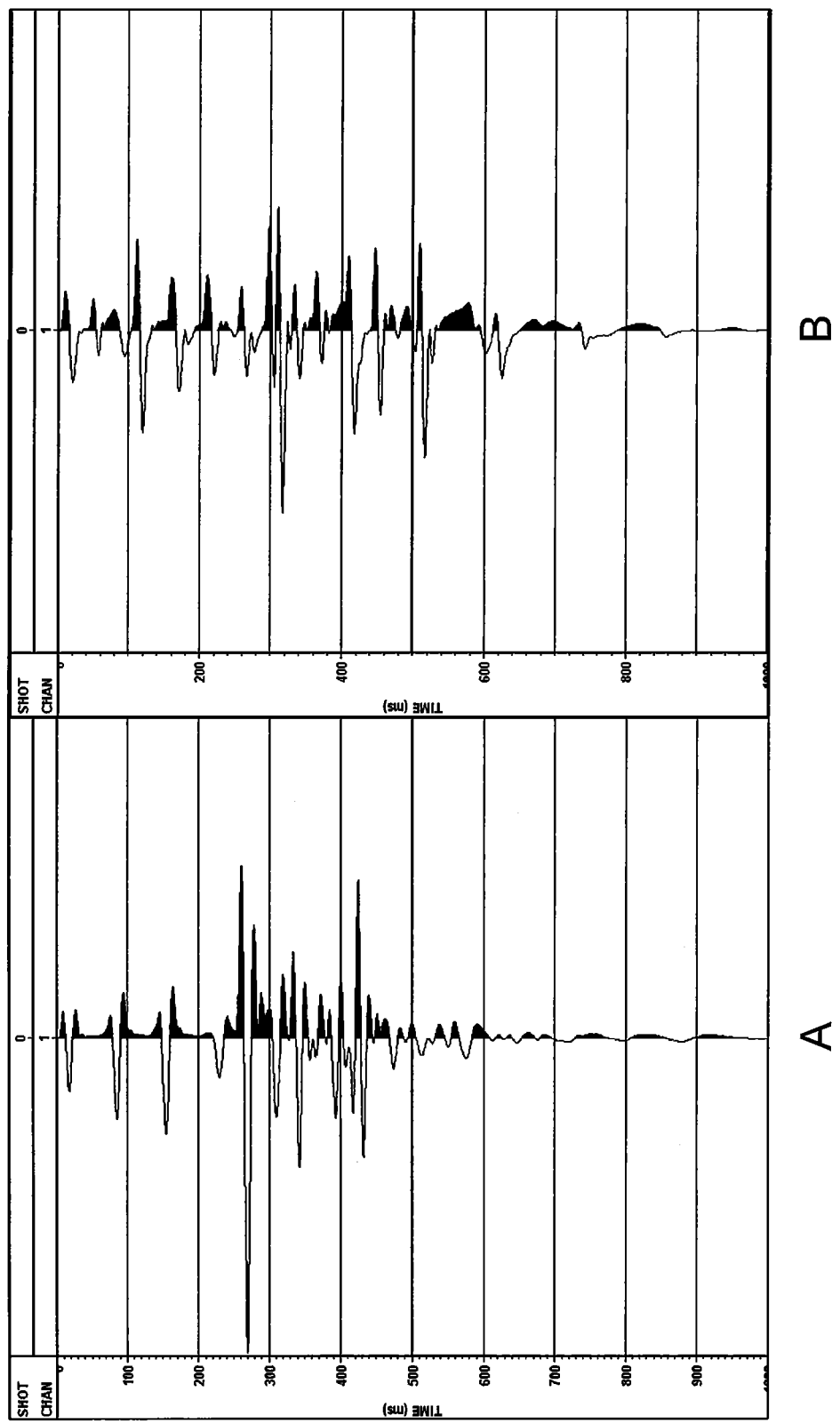
FIG. 8 is a chart showing a comparison of the time and intensity of the energy emitted with the firing of the same array of air guns where two different composite pulse are undertaken, Composite Pulse A and Composite Pulse B.

As an example of greater variability within a volley, FIG. 4 shows a complete single composite pulse undertaken in just under three tenths of a second. This is probably more compressed than preferred recognizing that for the next composite pulse, each of the guns will need to recharge with compressed air but it is demonstrative of the variability that can be created using this technique. This FIG. 4 is an idealized display where FIG. 8 shows two gun firing composite pulses as recorded by a seismic receiver located with the airguns.

The unique signal can be analogized to being in a crowded room with a lot of people talking and a person being able to lock his hearing into one person talking just based on some uniqueness of that person's voice. Not necessarily because that person is talking louder than others, but because of some combination of tone or frequency or amplitude variations of the speakers voice. There are some very key analogs that can be derived from this concept of a crowded room and trying to listen to a conversation. One is that the source must put out a sufficient volume to be detected. But at the same time just going louder tends to encourage other sources to also get louder which provides no advantage. Another observation is that the more unique a person's voice is, the easier it is to sort out or distinctly hear that person's voice from the others in the room. Thus, the number of alternative noise sources that are active in the room, the more unique the person's voice should be to hear it. Returning to the sequence of firing a source array, the variations in size, timing and duration of the firing of the coded shot should be carefully designed prior to acquisition. To a certain extent, the various unique composite pulses that may be used might also be site specific and variable from site to site. There may not be one "perfect" answer but this can easily be modeled and tuned for different situations.

The first benefit of delivering seismic energy into the marine environment in this manner is that it would allow two or three or even many different survey teams to operate at essentially the same time in the same area. This is a breakthrough for field operations and acquisition as it completely eliminates the traditional time share problem of the conventional sharp peak air gun sourcing. This also allows for wide azimuth acquisition in a cost effective manner as we can now source many different lines at the same time and at much tighter station spacing with minimal to no contamination. This can be done because the unique signature of the pulses can be identified by each system and will ignore the other pulses as noise. This can be done through the inversion process of the data. Essentially, the processing would involve taking a block of simultaneously recorded data starting at the time zero for a particular composite pulse within a loop and then one could shape filter, deconvolve or even invert for the actual shot record and the desired output listen time. These processes are well documented and used in the ZenSeis™ acquisition technique and there are many related patents on the art of this technique.

The second benefit of delivering seismic energy into the marine environment in this manner is that it distributes the energy into the water over time in such a manner that peak energy is significantly less. Actually, based on current methods of calculating energy emitted into a marine environment is based on measurement of peak signal as compared to bubble size created by each pulse. Bubbles created by air guns are very elastic in water and appear to bounce in size from a large bubble to a small bubble and back to a large bubble. As the bubble created by one air gun is created, another air gun is fired such that the ratio actually may be negative. A negative ratio would imply that sound is actually being taken out of the water, but that is an artifact of the calculation. What is important is that with the present invention, what would have been a very loud crack or bang becomes a more tolerable background rumble that should be much less irritating to marine life. A very good analogy to this is listening to the thunder. When one is close, it can be quite scary and quite a shock as it is quite loud and forms a strong pulse. On the other hand, due to interactions of the thunder crack with the earth effects, at long distances thunder is just a low rumble which is much more tolerable. The invention takes the sharp crack of thunder and turns it into a rumble that is uniquely tuned to each source. Thus, seismic surveying in a marine environment becomes multiple rumbles occurring at once and each can easily be sorted out to know where it came from.

Figure 5:
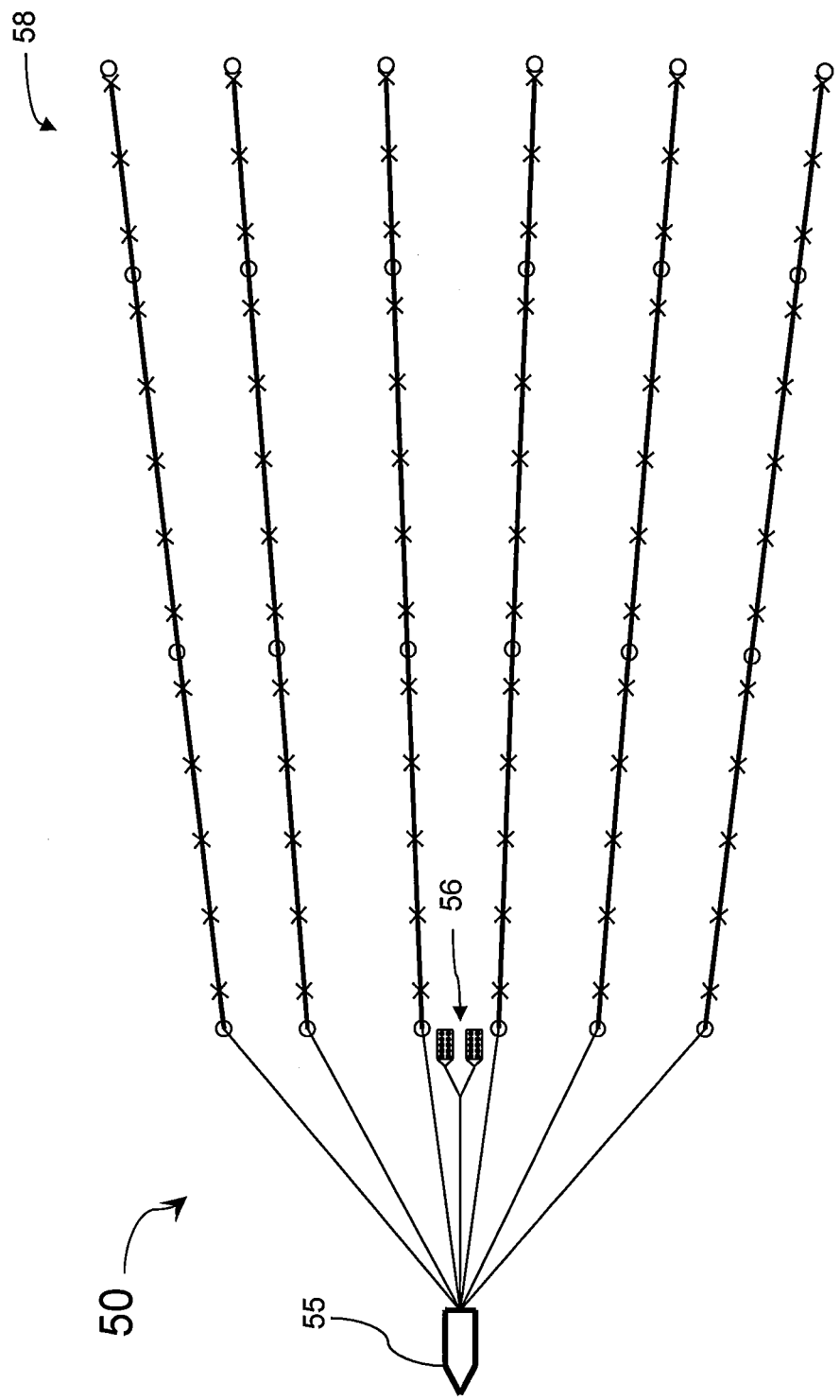
FIG. 5 is a schematic top view of a tow vessel towing two seismic source arrays and streamers where the streamers are flared.

Turning now to FIG. 5, a marine seismic acquisition system 50 with a flared receiver array 58 is shown that is comparable to the system 10 in FIG. 1. The flared receiver array 58 is preferred in that the risk of gaps of coverage in both the near receivers (closest to the tow vessel 55) and far receivers (farthest from the tow vessel 55) is reduced. Side by-side dual source arrays 56 are shown between the middle two streamers of receiver array 58 representing conventional flip flop shooting style acquisition.

Figure 6:
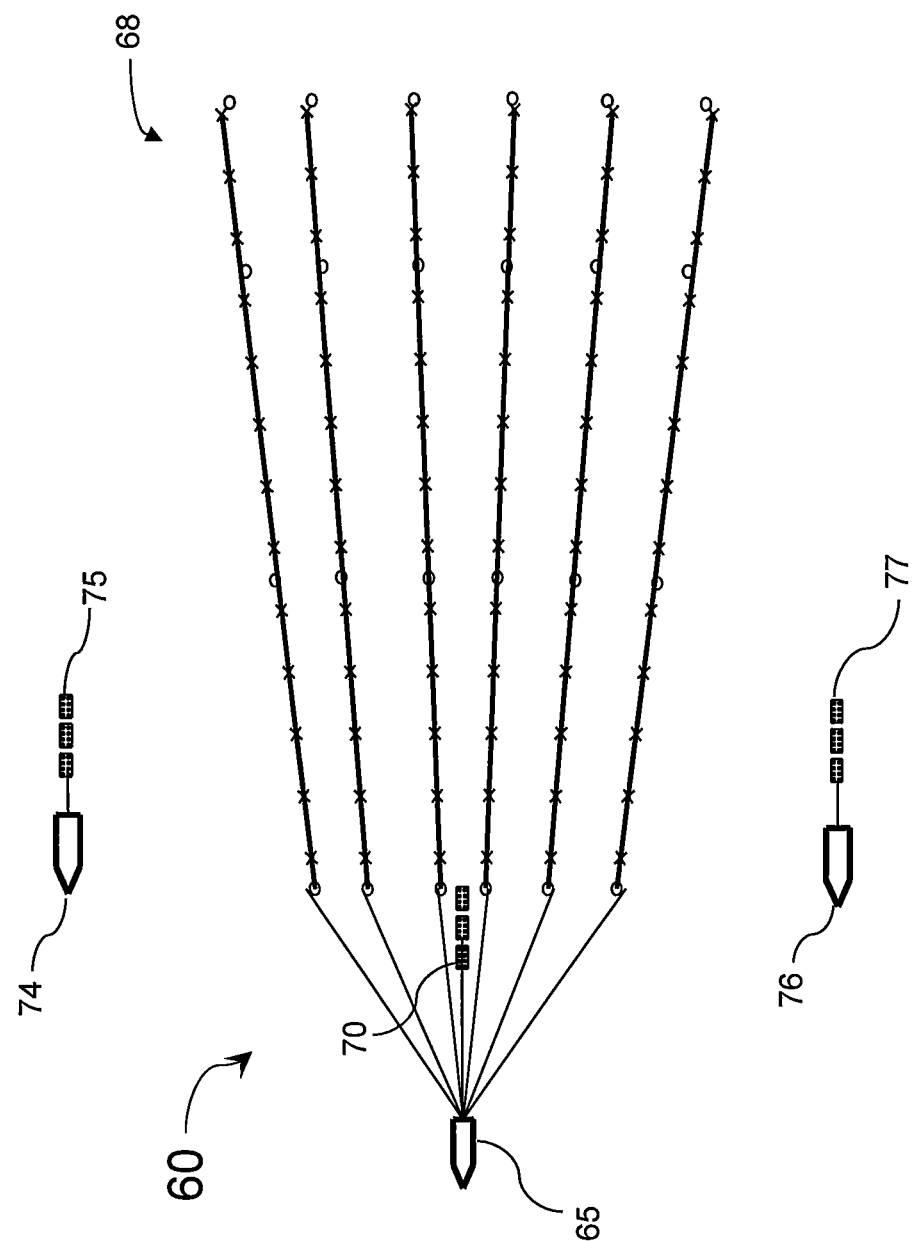
FIG. 6 is a schematic top view of a tow vessel towing seismic sources and streamers with additional source vessels towing additional seismic sources operating in conjunction with the tow vessel to acquire a higher volume of seismic data in one pass through the survey area.

Turning to FIG. 6, a marine seismic acquisition system is indicated by the arrow 60. In system 60, a receiver array 68 is towed by a tow vessel 65. Tow vessel 65 includes source arrays 70 that comprise a plurality of pulse type seismic sources such as air guns that are arranged to be fired in the manner described above where the array is fired in a composite pulse that is uniquely coded and identifiable in the return wavefield where the energy is spread out over time. In this Figure, the source arrays 70 are shown as three in-line arrays instead of the more common dual, side-by-side arrays or single array that could be used. In addition, the system 60 includes auxiliary source vessels 74 and 76 and their source arrays 75 and 77, respectively, arranged to follow the tow vessel 65 on either side of the receiver array 68. The reason for this inline arrangement is that it can be used in two methods. Either it can be used to create a normal composite pulse as described above, or the sources can be fired continuously to allow for a much shorter bin size due to a short shot point increment as compared to other industry techniques.

Figure 7:
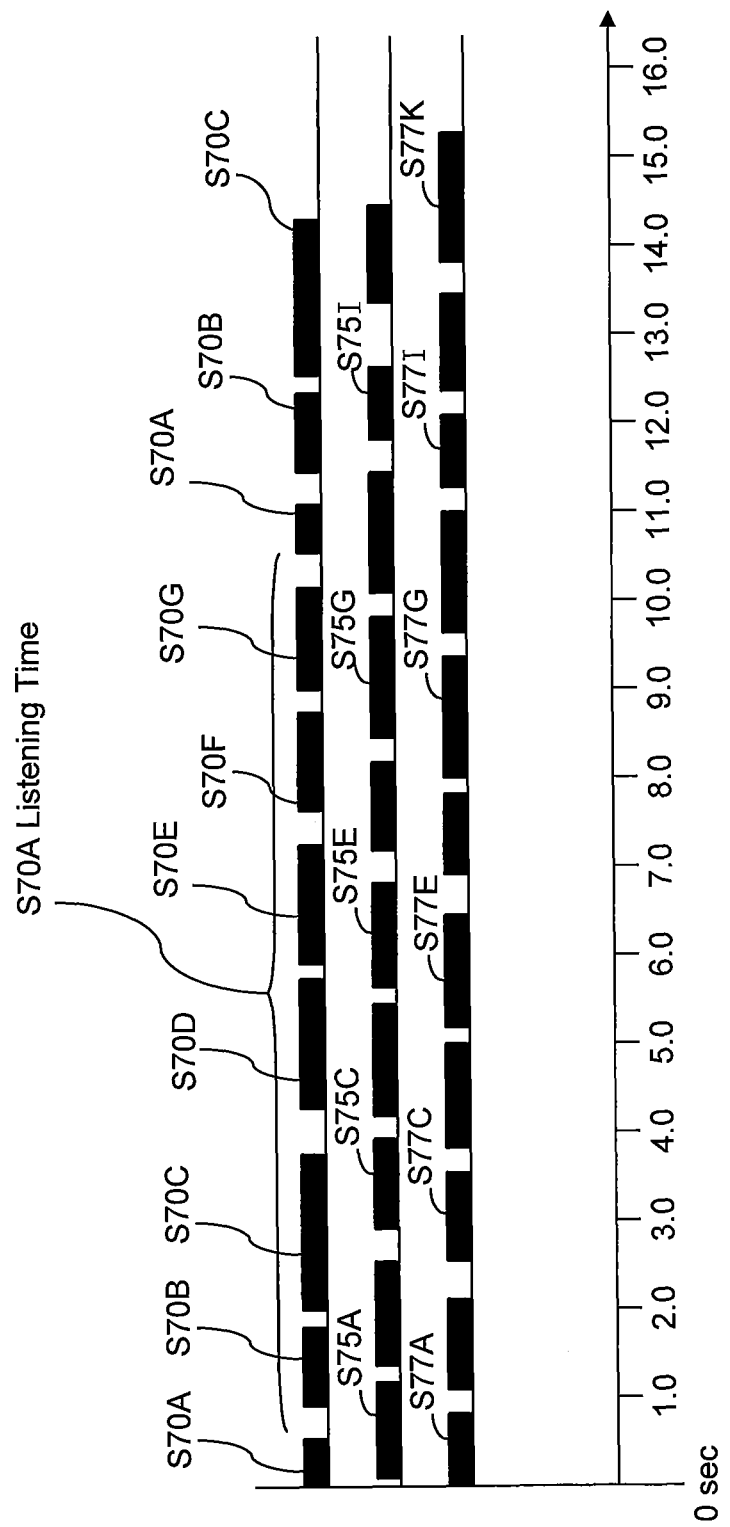
FIG. 7 is a chart showing a plan for several source arrays where each source array delivers a series of distinctive composite pulses and collect data in a single receiver array.

Another optional arrangement is to tow a source array behind the receiver array 68. Each auxiliary source vessel has its own loop of distinctive composite pulses whether the composition of the source array is identical to any other source array. As such, acquiring seismic data with the system 60 may include concurrent rumbles from the source array 70 while distinctive rumbles emanate from source arrays 75 and 77. This is illustrated in FIG. 7 where each line represents one full loop and the beginning of a second loop. The seismic receivers on the streamers 68 are continuously recording seismic data along with their location based on GPS data.

Continuing with the description of FIG. 7, each horizontal bar represents a composite pulse where S70A is the first composite pulse of source 70 for the loop that source 70 will emit. S70B is the second composite pulse and S70C is the third composite pulse and so on. The time that elapses after S70A has been emitted until the loop begins again with S70A is the available listening time for S70A. An essentially equivalent listening time will be provided for each composite pulse. Similarly, it should be seen that all of the source arrays will be emitting their loops in a generally concurrent arrangement where the signals overlap. However, since each composite pulse is distinctive from all other composite pulses in all of the loops, post recording processing may source separate the signal received by each receiver in the receiver array. It should also be recognized that the various composite pulses may be synchronized such that one composite pulse from one vessel may end at the nearly the precise moment another source array begins to emit its composite pulse. Thus, the various loops may be choreographed so that continuous data is collected, but that the energy in the water is managed.

It should further be understood that prior to undertaking the data collection, the composite pulses should be designed and analyzed for their distinctness. There are many methods of creating distinctiveness and it is believed that distinctiveness can be designed such that every composite pulse can be provided with no more than two discrete pulses in sequence that will be the same and that any three discrete pulses in a row can be made distinctive.

Two separate crews using the inventive techniques may overlap signals, however, care should be taken in designing composite pulses to try and collect data with a conventional sharp pulsed air gun system while an inventive system is in the area. The conventional system will not interfere very much with an inventive system, but the conventional system will likely have difficulty identifying their generic return wavefield from the returning wavefields from the inventive system.

It should be noted that the invention is described as having a plurality of pulse-type seismic sources which are most commonly air guns. Other types of pulse-type sources are available. Moreover, a plurality of pulse-type sources are not necessarily required to practice the broadest form of the present invention. Specifically, given a very short cycle time between successive firings of the same device, a single, highly controlled pulse-type source device may create the composite pulses and the loops without having to have additional such devices. While it is preferred to have a variety of reasonably different sources, as long as the energy is emitted in a manner that is a distinctive series of pulses, the broadest aspect of the invention may be practiced.

Moreover, this type of seismic data acquisition should not be limited to a marine environment. While pulse type sources are commonly used in marine environments, pulse type sources may be used on land, too. As such, a land application using pulse type sources with distinctive composite pulses for source separation should be equally useful and beneficial on land. Land examples of pulse type sources are accelerated weight drops, explosives, thumper trucks and even conventional vibes if properly set up.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for acquiring seismic data and providing information about geologic structures in the earth, wherein the process comprises:
   a) providing a plurality of seismic receivers to receive seismic energy;
   b) providing at least one pulse-type seismic source to emit pulses of seismic energy into the earth;
   c) firing a distinctive non-orthogonal series of pulses of seismic energy into the earth to create a seismic energy wavefield response from geologic structures in the earth where the distinctive series of pulses of seismic energy are delivered in a loop from said at least one pulse-type seismic source in a planned order where the loop is of sufficient length to provide listening time to receive the wave field response from the geologic structures in the earth from a portion of the loop defined as a composite pulse before the distinctive series of pulses of the loop end and are restarted and wherein the series of pulses within the loop are sufficiently distinctive so as not to confuse parts of the loop with other parts of the loop and sufficiently distinctive so as to distinguish the wavefield caused by the loop from seismic energy in the environment that arises from other sources;
   d) receiving seismic energy with the plurality of seismic receivers including the seismic energy wavefield response from the geologic structures in the earth;
   e) recording the seismic energy wavefield response received by the seismic receivers to form data traces; and
   f) processing the data traces of recorded seismic energy to separately identify within the data traces the composite pulses of the pulse-type seismic source when the composite pulses were fired.

2. The process according to claim 1 wherein at least one pulse-type seismic source comprises a plurality of pulse-type seismic sources and no more than half of the seismic sources are fired in unison.

3. The process according to claim 1 wherein the step of firing a distinctive series of pulses creates a first loop, and wherein the process further comprises firing a distinctive series of pulses from a second pulse-type seismic source which creates a second loop wherein the first loop is distinctive from the second loop, and the step of recording the seismic energy includes recording seismic energy from wave fields created by the first loop and the second loop and the step of processing further includes separating the wavefield response in the data traces based on the source of the first loop from the source of the second loop.

4. The process according to claim 1 wherein the loop comprises a series of at least three separate distinctive composite pulses wherein each composite pulse is fired within two seconds of the one that precedes it.

5. The process according to claim 1 wherein the loop comprises a series of at least three separate distinctive composite pulses wherein each composite pulse is fired within four seconds of the one that precedes it.

6. The process according to claim 1, wherein the series of pulses are emitted by a plurality of different types of pulse-type seismic sources and the loop is made distinctive by varying the order of firing of the different types of pulse-type seismic sources.

7. The process according to claim 6, wherein the different type of pulse-type seismic sources are air guns of different sizes or designs.

8. The process according to claim 1, wherein the series of pulses is made distinctive by varying the timing between the firing of each pulse.

9. The process according to claim 1 where the pulse-type seismic source comprises a plurality of pulse-type seismic sources towed by a vessel and arranged in at least a first array and a second array and the sequence of firing of the first array is distinct from the sequence of firing of the second array.

10. The process according to claim 9 where the plurality of seismic sources include at least a third array, and the sequence of firing of the third array is distinct from the sequence of firing of the other arrays.

11. The process according to claim 9 where the first and second arrays are towed by different vessels.

12. The process according to claim 11 wherein the arrays are fired in a synchronized order.

13. The process according to claim 11 wherein the arrays are fired in a non-synchronized order.

14. The process according to claim 11 wherein at least one vessel tows more than one array of pulse-type seismic sources where vessels that tow more than one array have the arrays arranged in a desired geometry so as to deliver seismic energy from spaced source locations wherein the spaced source locations are also source separable in the data traces by firing a distinctive series of pulses from each array.

15. The process according to claim 9 where the plurality of seismic sources are towed by a plurality of seismic vessels, each seismic vessel having at least one pulse-type seismic source and the sequence of firing of each seismic source is distinct from the sequence of firing of the other seismic sources.

16. The process according to claim 1 wherein the sources are in the water and the pulses create a rumble in the water.

17. The process according to claim 1 wherein the step of providing at least one pulse-type seismic source more particularly comprises moving a first pulse-type seismic source into a desired location while also moving at least a second pulse-type seismic source into a second desired location and the step of firing a series of pulses further comprises each of said first and second sources firing a series of pulses where the sequence of firing of the first seismic source is distinct from the sequence of firing of the second seismic source.

18. The process according to claim 1 where a first seismic source is moved onto a first location, and a second seismic source is moved onto a second location and the repeated composite pulse firing sequence of the first source is distinct from the repeated composite pulse firing sequence of the second source so that two distinct pulse-type wavefields are produced.

19. The process according to claim 18 where a third seismic source is moved onto a third location and the repeated composite pulse firing sequence of the third source is distinct from the composite pulse firing sequence of the first and second sources.

20. The process according to claim 1 further comprising a plurality of seismic sources that are moved onto desired locations and wherein each seismic source has its own distinctive composite pulse firing sequence and the sources are fired in a non-synchronized order.

21. The process according to claim 1 further comprising a plurality of seismic sources that are moved onto desired locations and wherein each seismic source has its own distinctive composite pulse firing sequence and the sources are fired in a non-synchronized order.

22. The process according to claim 1 where the plurality of seismic sources are moved onto a first desired location and comprise a first array, and a second array of seismic sources are moved onto a second desired location and the composite pulse firing sequence of the first array is distinct from the composite pulse firing sequence of the second array.

23. The process according to claim 1 where the plurality of seismic sources are moved onto a desired location and comprise a first array, and more than two additional arrays of seismic sources are moved onto other desired locations and the composite pulse firing sequence of the first array and all other arrays are distinct from the composite pulse firing sequence of all other arrays.

24. The process according to claim 1 where the plurality of seismic sources are moved onto a desired location and comprise a first array, and more than two additional arrays of seismic sources are moved onto other desired locations and wherein each array has its own distinctive composite pulse firing pattern and the arrays are fired in a synchronized order.

25. The process according to claim 1 where the plurality of seismic sources are moved onto a desired location and comprise a first array, and more than two additional arrays of seismic sources are moved onto other desired locations and wherein each array has its own distinctive composite pulse firing pattern and the arrays are fired in a non-synchronized order.

26. The process according to claim 1 wherein the seismic source is imparting seismic energy into the earth and the firing of the plurality of seismic sources creates a rumble in the earth.

27. The process according to claim 1 wherein the pulses are created by firing one or more seismic sources and the loop includes firing of each seismic source at least three times.

28. The process according to claim 1 wherein the pulses are created by firing one or more seismic sources, wherein firing of the plurality of seismic sources includes firing each seismic source at least ten times.

* * * * *